F. Brown,
Oscillating Steam Engine.
Nº 52,024. Patented Jan. 16, 1866.
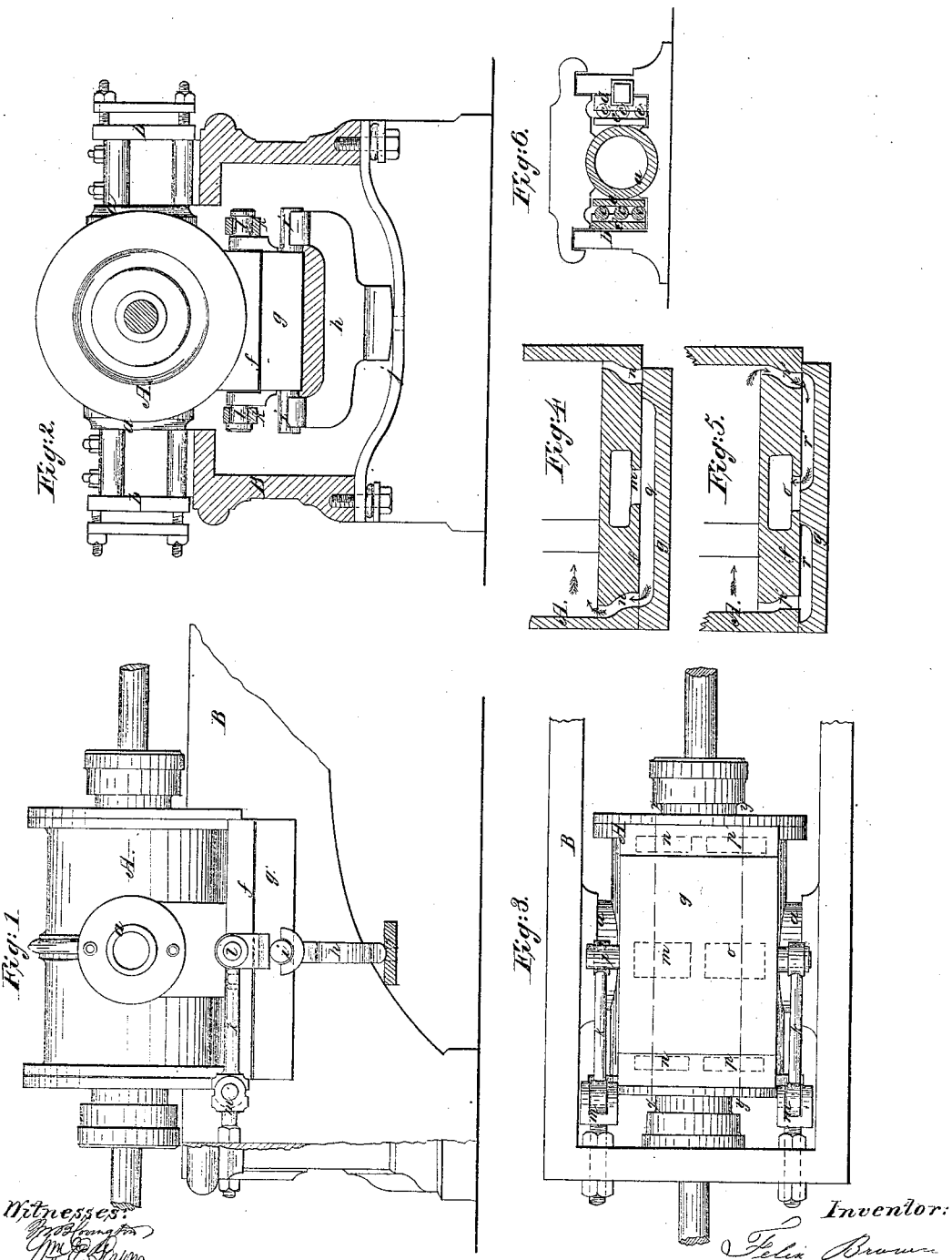

UNITED STATES PATENT OFFICE.

FELIX BROWN, OF NEW YORK, N. Y.

IMPROVEMENT IN OSCILLATING ENGINES.

Specification forming part of Letters Patent No. 52,024, dated January 16, 1866.

*To all whom it may concern:*

Be it known that I, FELIX BROWN, of the city, county, and State of New York, have invented a new and useful Improvement in Oscillating Engines; and I do hereby declare that the following is a full, clear, and exact description thereof, which will enable others skilled in the art to make and use the same, reference being had to the accompanying drawings, forming part of this specification, in which—

Figure 1 represents a sectional side elevation of this invention. Fig. 2 is a sectional end view of the same. Fig. 3 is an inverted plan of the same. Fig. 4 is a longitudinal vertical section of the steam-valve, the plane of section being taken through the steam-ports, as indicated by the line $x\,x$, Fig. 3. Fig. 5 is a similar section through the exhaust-ports, as shown by the line $y\,y$, Fig. 3. Fig. 6 is a detached sectional side elevation of one of the pillow-blocks which support the trunnions of the oscillating cylinder.

Similar letters of reference indicate like parts.

This invention consists in combining with an oscillating steam-cylinder a flat reciprocating valve supported by or held in contact with its seat by a parallel motion in such a manner that, notwithstanding the oscillating motion of the cylinder and valve-seat, the flat valve will be constantly held in close contact with said seat, and the seat, as well as the face of the valve, can be easily fitted or refitted by the aid of a planing-machine, and little time is lost by this operation. In order to keep the valve in close contact with its seat under all circumstances, and to make up for any slight inaccuracies in the fulcra of the parallel motion, said valve is seated on a yielding support. The bearings of the trunnions of the oscillating cylinder are in pillow-blocks the sides of which are lined with rollers interposed between suitable plates in such a manner that the strain exerted by the action of the piston on the trunnions is entirely supported by the inner plates and the sliding friction of the trunnions in their bearings is almost entirely converted into rolling friction.

A represents a steam-cylinder which is hung on trunnions $a$, that have their bearings in pillow-blocks $b$, supported by the frame or bed B. The ends of these pillow-blocks are lined with rollers $c$, which are placed in small boxes $d$ and covered up by plates $e$, that are interposed between the rollers and the trunnions, as shown particularly in Fig. 6. The plates $e$ are somewhat lower than the space allotted to them in the pillow-blocks, and as the trunnions oscillate the plates travel up and down, and the sliding friction is mostly converted into rolling friction, thus reducing the power required to impart to the cylinder the desired oscillating motion. Said cylinder is provided with a flat valve-seat, $f$, on its under or upper side, and on their seat moves a valve, $g$, the face of which is also flat, so that both the seat and face of the valve can be planed off, and, if either or both should wear out, they can be easily refitted. Said valve is supported by a fork, $h$, the prongs of which form the bearings for gudgeons $i$, projecting from the edges of the valve, as shown particularly in Fig. 2 of the drawings. The shank of said fork rests on a spring-bar, $j$, which is secured to the frame or bed B, and which is made yielding, so as to make up for any inaccuracies in the construction of the mechanism, and said shank is so arranged that it is free to rock in the direction in which the valve moves. The reciprocating motion of the valve is produced by the action of links $k$, secured in suitable lugs attached to the sides of the valve to eyebolts $m$, fastened in the sides of the frame or bed B. By this arrangement, if the cylinder begins to oscillate a double motion is imparted to the valve—viz., a reciprocating motion on its seat and a rocking motion on the fork $h$, and at the same time the fork itself rocks on the spring-bar $j$, and by the combined rocking motion of the fork and of the valve itself a sort of a parallel motion is produced, whereby the face of the valve is held in close contact with the seat during its entire stroke.

In the drawings I have shown the valve arranged underneath the cylinder, and I prefer this position because, in this case, the frame or bed can be used as a support of the several parts connected with the valve, and the water of condensation, which may leak out between the valve and its seat, is prevented from soiling the cylinder or any part of the engine, although it must be remarked that the valve might be arranged on the upper side of the cylinder without essentially changing the construction of the mechanism. The steam is admitted through one of the trunnions of the cylinder, and it exhausts through the other. No valve-chest is required; but the valve is divided in two sections, one of which forms the supply part and the other the exhaust part, and in the seat are six ports, $m$ $n$ $n'$ $o$ $p$ $p'$, as shown in dotted lines in Fig. 3, three for the supply and three for the exhaust. The port $m$ communicates, by a suitable channel, with one of the hollow trunnions of the cylinder, and the ports $n$ $n'$ lead to the interior of said cylinder, on the opposite ends thereof, and the valve is provided with a cavity, $q$, (see Fig. 4,) which alternately covers the ports $m$ and $n$, and then again the ports $m$ and $n'$. The port $o$ communicates with the exhaust-channel through the other trunnion of the cylinder, and the channels $p$ $p'$ lead to the interior of the cylinder, as shown in Fig. 5. That portion of the valve which covers the ports $o$ $p$ $p'$ is provided with two cavities, $r$ $r'$, which are so situated that when the cavity $q$, Fig. 4, covers the steam-ports $m$ and $n$ the cavity $r'$ forms a communication between the ports $o$ and $p'$, and if the valve is changed so that the cavity $q$ covers the ports $m$ and $n'$, then the cavity $r$ forms a communication between the ports $o$ and $p$. By this arrangement the steam is changed in a simple manner, easy access can be had to the valve, the position of the valve can be readily adjusted by lengthening or shortening the links $k$, and if the face of the valve or its seat should wear out it can easily be refitted.

If desired, the position of the valve and cylinder may be reversed—that is to say, the valve may be located at the upper side of the cylinder.

Having thus described my invention, I claim as new and desire to secure by Letters Patent—

1. The arrangement of a flat seat on an oscillating cylinder, to operate in connection with a flat open slide-valve, substantially as set forth.

2. The rocking fork $h$ and links $k$, in combination with the valve $g$ and oscillating cylinder A, constructed and operating substantially as and for the purpose described.

3. The spring-bar $j$, in combination with the fork $h$, valve $g$, and oscillating cylinder A, constructed and operating substantially as and for the purpose set forth.

4. The rollers $c$ and traveling plates $e$, in combination with the trunnions of an oscillating cylinder, constructed and operating substantially as and for the purpose described.

FELIX BROWN.

Witnesses:
M. M. LIVINGSTON,
C. L. TOPLIFF.